United States Patent
Salter et al.

(10) Patent No.: US 11,546,754 B1
(45) Date of Patent: Jan. 3, 2023

(54) VEHICLE MESSAGING

(71) Applicant: Ford Global Technologies, LLC, Dearborn, MI (US)

(72) Inventors: Stuart C. Salter, White Lake, MI (US); Pietro Buttolo, Dearborn Heights, MI (US); David Brian Glickman, Southfield, MI (US); John Robert Van Wiemeersch, Novi, MI (US); Annette Lynn Huebner, Highland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 17/373,818

(22) Filed: Jul. 13, 2021

(51) Int. Cl.
| | |
|---|---|
| *H04W 12/00* | (2021.01) |
| *H04W 12/108* | (2021.01) |
| *H04L 67/12* | (2022.01) |
| *H04W 12/69* | (2021.01) |
| *H04W 12/06* | (2021.01) |
| *H04W 12/63* | (2021.01) |

(52) U.S. Cl.
CPC ........... *H04W 12/009* (2019.01); *H04L 67/12* (2013.01); *H04W 12/06* (2013.01); *H04W 12/108* (2021.01); *H04W 12/63* (2021.01); *H04W 12/69* (2021.01)

(58) Field of Classification Search
CPC . H04W 12/009; H04W 12/06; H04W 12/108; H04W 12/63; H04W 12/69; H04L 67/12
See application file for complete search history.

(56) References Cited

U.S. PATENT DOCUMENTS

| | | |
|---|---|---|
| 8,768,565 B2 | 7/2014 | Jefferies et al. |
| 9,443,270 B1* | 9/2016 | Friedman ............... G06Q 40/08 |
| 10,984,243 B2 | 4/2021 | Lamont |
| 2019/0088036 A1 | 3/2019 | Van Wiemeersch et al. |

FOREIGN PATENT DOCUMENTS

| | | | |
|---|---|---|---|
| CN | 106571998 A | 4/2017 | |
| CN | 111988374 A | 11/2020 | |
| WO | WO-2005013172 A2 * | 2/2005 | ............... G07C 1/20 |

* cited by examiner

*Primary Examiner* — Brandon J Miller
(74) *Attorney, Agent, or Firm* — Brandon Hicks; Bejin Bieneman PLC

(57) ABSTRACT

A central computer includes a first processor and a first memory. A portable computer includes a second processor and a second memory. The portable computer is programmed to: obtain an identifier of a vehicle via a scanner included in the portable computer, and transmit the identifier and first validation data to the central computer, and transmit a message to the central computer for a destination computer. The central computer is programmed to receive the identifier and the first validation data from the portable computer, determine second validation data; identify a destination computer based on the identifier, and upon determining that a comparison of the first validation data and the second validation data meets a specified criterion, transmit the message from the portable computer to the destination computer.

19 Claims, 2 Drawing Sheets

VEHICLE MESSAGING

BACKGROUND

Vehicles, by their nature, can be parked or stored in a variety of locations. When a vehicle is at a location, various communications may be useful or desirable about the vehicle and/or the location, e.g., between devices in the vehicle and/or devices remote from the vehicle.

DETAILED DESCRIPTION

Figure 1:
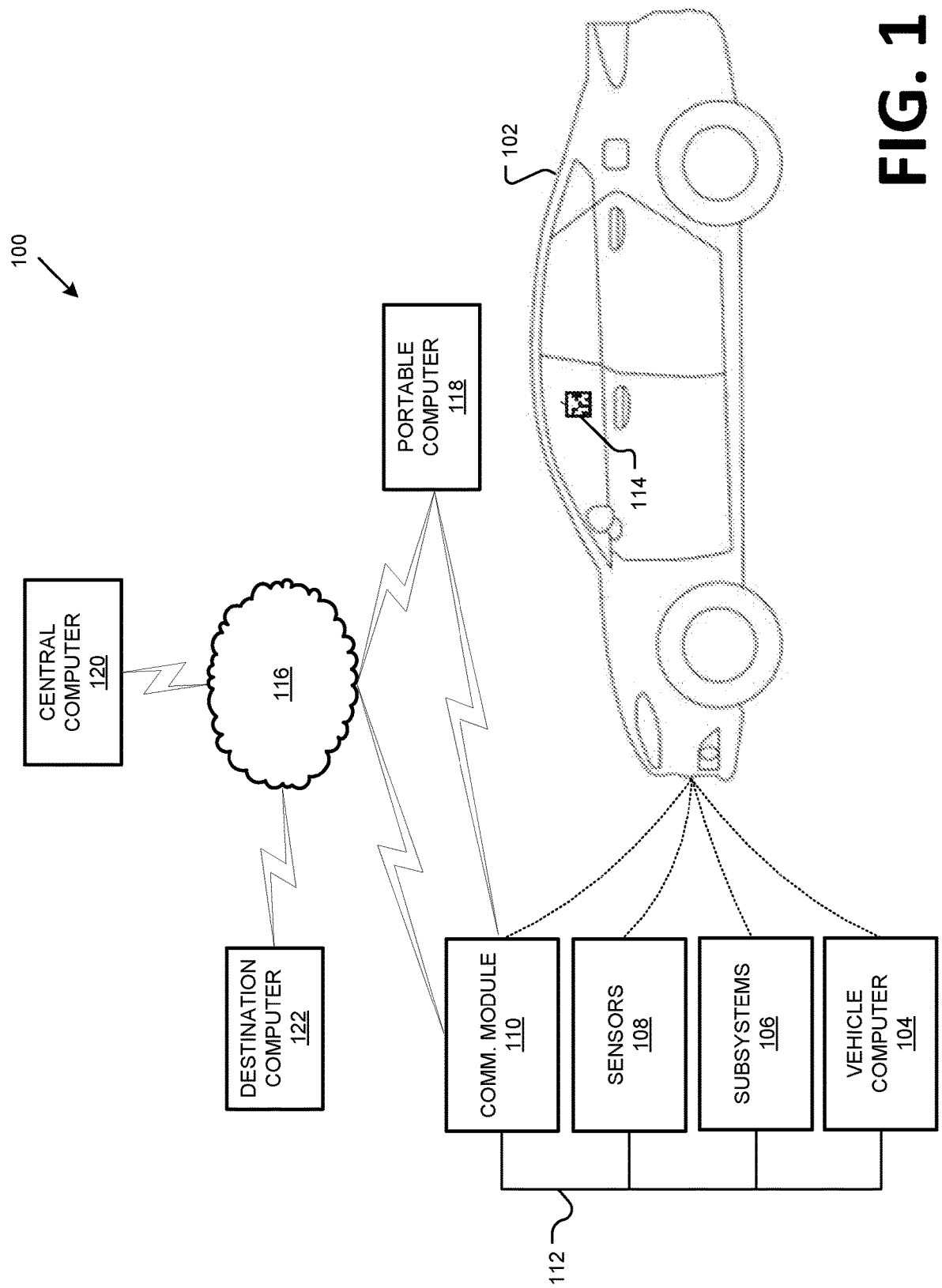
FIG. 1 is a block diagram of an example messaging system.

With reference to FIG. 1, a messaging system 100 can provide communications between one or more vehicles 102 and one or more portable computers 118, a central computer 120, and/or a destination computer 122. A vehicle 102 can be provided with an identifier, e.g., a pattern included in an image tag 114, whereupon a portable computer 118 can scan the image tag 114 to provide the identifier to the central computer 120, typically along with other data to validate the portable computer 118, such as location coordinates of the portable computer 118. The portable computer 118 can further send to the central computer 120 a message to be delivered to a destination computer 122 associated with the vehicle 102. The central computer 120 in turn can, upon receiving the identifier and first validation data from the portable computer 118, determine second validation data, e.g., location coordinates of the vehicle 102, and can further identify the destination computer 122 as a computer to receive messages associated with the vehicle 102 based on the identifier. Then, upon determining that a comparison of the first and second validation data meets a specified criterion, e.g., the first and second validation data respectively specify locations within a threshold distance of one another, or include a same alphanumeric passcode or the like, in which cases the first and second validation data can be said to match, the central computer 120 can transmit the message provided from the portable computer 118 to the destination computer 122.

Accordingly, a system comprises a central computer including a first processor and a first memory. The system further comprises a portable computer including a second processor and a second memory. The portable computer is programmed to obtain an identifier of a vehicle via a scanner included in the portable computer, and transmit the identifier and first validation data to the central computer, and transmit a message to the central computer for a destination computer. The central computer is programmed to receive the identifier and the first validation data from the portable computer, determine second validation data; identify a destination computer based on the identifier; and upon determining that a comparison of the first validation data and the second validation data meets a specified criterion, transmit the message from the portable computer to the destination computer.

The identifier can be provided on a vehicle window and/or can be provided wirelessly.

The first validation data can be based on location coordinates of the portable computer and the second validation data can be based on location coordinates of the vehicle.

The specified criterion can be that the first validation data and the second validation data match.

The portable computer can be further programmed to receive the first validation data via user input.

The portable computer can be further programmed to receive the second validation data via wireless communication from the vehicle computer, and to transmit the first validation data to the central computer based on the second validation data received from the vehicle computer.

The central computer can be further programmed to send a response to the message provided from the destination computer to the portable computer.

The central computer can be further programmed to send a response to the message to the portable computer specifying a status of the vehicle.

The central computer can be further programmed to transmit the second validation data to the vehicle computer.

The central computer can be further programmed to authenticate the portable computer as being entitled to send the message prior to determining the second validation data.

The central computer can be further programmed to determine an address of the destination computer based on the identifier of the vehicle.

The destination computer can be the vehicle computer or a fourth computer.

The central computer can be further programmed to transmit the message to a plurality of destination computers including the destination computer.

The system can further comprise the vehicle computer including a third processor and a third memory.

The vehicle computer can further be programmed to display the second validation data via a vehicle human machine interface (HMI).

The vehicle computer can further be programmed to store an image captured by a vehicle camera of an environment exterior to the vehicle upon receiving a request for the second validation data from the central computer.

The vehicle computer can further be programmed to receive input for the message via a microphone arranged to detect sound outside of the vehicle, and to transmit the input to the central computer.

The vehicle computer can further be programmed to provide output representing a response to the message via a vehicle HMI (human machine interface).

A vehicle 102 is a set of components or parts, including hardware components and typically also software and/or programming, to perform a function or set of operations in the vehicle 102. Vehicle subsystems 106 typically include a braking system, a propulsion system, and a steering system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed vehicle computer 104, portable computer 118, central computer 120, and/or destination computer 122, include respective processors and memories. A computer memory can include one or more forms of computer readable media, and stores instructions executable by a processor for performing various operations, including as disclosed herein. For example, the computer can be a generic computer with a processor and memory as described above and/or a vehicle computer 104, for example, may include an electronic control unit (ECU), controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

A computer memory can be of any suitable type, e.g., hard disk drives, solid state drives, servers, or any volatile or non-volatile media. The memory can store data, e.g., a memory of a vehicle computer 104 can store data sent from vehicle sensors 108. The memory can be a separate device from the computer, and the computer can retrieve information stored in the memory, e.g., a vehicle computer 104 can obtain data to be stored via a vehicle network 112 in the vehicle 102, e.g., over a CAN bus, a wireless network, etc. Alternatively, or additionally, the memory can be part of the computer, i.e., as a memory of the computer.

The vehicle computer 104 can be included in a vehicle 102 that may be any suitable type of ground vehicle 102, e.g., a passenger or commercial automobile such as a sedan, a coupe, a truck, a sport utility, a crossover, a van, a minivan, a taxi, a bus, etc. A vehicle computer 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations. Additionally, a vehicle computer 104 may be programmed to determine whether and when a human operator is to control such operations.

A vehicle computer 104 may include or be communicatively coupled to, e.g., via a vehicle network 112 such as a communications bus as described further below, more than one processor, e.g., included in components such as sensors 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually comprises a plurality of devices, the vehicle 102 communication network may be used for communications between devices represented as the computer in this disclosure.

Various controllers and/or sensors 108 may provide data to the computer via the vehicle 102 communication network. Vehicles 102, such as autonomous or semi-autonomous vehicles 102, typically include a variety of sensors 108. A sensor is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system (GPS) sensors 108; accelerometers such as piezo-electric or microelectromechanical systems (MEMS); gyroscopes such as rate, ring laser, or fiber-optic gyroscopes; inertial measurements units (IMU); and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure (V2I) or vehicle-to-vehicle (V2V) devices. Sensor operation can be affected by obstructions, e.g., dust, snow, insects, etc. Often, but not necessarily, a sensor includes a digital-to-analog converter to converted sensed analog data to a digital signal that can be provided to a digital computer, e.g., via a network.

Sensors 108 can include a variety of devices as mentioned above, and can be disposed to sense an environment, provide data about a machine, etc., in a variety of ways. For example, a sensor could be mounted to a stationary infrastructure element on, over, or near a road. Moreover, various controllers in a vehicle 102 may operate as sensors 108 to provide data via the vehicle network 112 or bus, e.g., data relating to vehicle 102 speed, acceleration, location, subsystem and/or component status, etc. Further, other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor data could include data for determining a position of a component, a location of an object, a speed of an object, a type of an object, a slope of a roadway, a temperature, a presence or amount of moisture, a fuel level, a data rate, etc.

A vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors 108, actuators, components, communications module, a human machine interface HMI, etc. Additionally, or alternatively, messages can be exchanged among various such other devices in vehicle 102 via a vehicle network 112. In cases in which computer actually comprises a plurality of devices, vehicle network 112 may be used for communications between devices represented as computer in this disclosure. Further, as mentioned below, various controllers and/or vehicle sensors 108 may provide data to the computer. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi®, Bluetooth®, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or Wi-Fi communication protocols.

The vehicle computer 104, portable computer 118, destination computer 122, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or a portable computer 118, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle 102, to an infrastructure element typically via direct radio frequency communications and/or typically via the wide area network 116, e.g. to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

A smartphone, tablet, or other suitable portable computing device could comprise the portable computer 118. The portable computer 118 can be programmed to obtain an identifier of a vehicle 102 via a scanner included in the portable computer 118, e.g., a camera or the like that can capture an image of an image tag 114. Further, the portable computer 118 can transmit the identifier, e.g., an image such as a QR (Quick Response) code or ArUco mark, a barcode, or the like provided on an image tag 114 on the vehicle 102, to the central computer 120. For example, a portable device could use any suitable wireless communications, such as cellular or WI-FI, to communicate with the central computer 120 via the wide area network 116.

Along with the identifier, the portable computer 118 can transmit first validation data to the central computer 120. The present disclosure describes "validation data" that can be sent from the vehicle computer 104 or the portable computer 118. For convenience and ease of distinction, validation data from a portable computer 118 is referred to as "first validation data" and validation data from a vehicle computer 104 is referred to as "second validation data." Note, however, that the adjectives "first" and "second" do not signify any order or precedence but are used simply to distinguish the different sets of validation data. Validation data is data that the central computer 120 can use, i.e., the central computer 120 can be programmed to compare or otherwise evaluate first and second validation data, to determine whether messaging can be provided to and/or from a portable computer 118 transmitting a vehicle 102 identifier.

In an example, the first validation data can specify a location according to location coordinates (e.g., GPS coordinates) or the like of the portable computer 118. The first validation data could be provided according to user input, e.g., a user specifying a street address or the like for which the portable computer 118 and/or the central computer 120 can determine location coordinates, and/or by the portable computer 118 providing location coordinates from a location sensor, e.g., a GPS sensor, included in the portable computer 118. Alternatively, or additionally, the user could input an alphanumeric code, or the like provided by the vehicle computer 104 via a vehicle 102 HMI, as described further below.

An image tag 114 is optically detectable data on a medium for display on a vehicle 102. For example, an image tag 114 can include a vehicle 102 identifier in the form of conventional marks or patterns such as a Quick Response (QR) code, ArUco fiducial marks, barcodes, etc. The medium for an image tag 114 can be a printed sticker or tag, for example, such as could be affixed to a vehicle 102 window, door panel, hood panel, etc. In one example, the image tag 114 is provided in or on a vehicle 102 window or windscreen as part of a frit, i.e., a ceramic material created by a fusion and/or calcination process. In another example, an identifier could be provided via other suitable mechanisms, e.g., wireless mechanisms such as an ultra-wideband (UWB) transmitter, an RFID tag or the like, rather than an image tag 114.

The portable computer 118 can further be programmed to transmit a message, e.g., text and/or image(s) provided from the portable computer 118, to the central computer 120 for a destination computer 122. For example, the destination computer 122 may be a device, e.g., a smartphone or the like, of a vehicle 102 owner, whereupon the portable computer 118 can be used to provide a message to the vehicle 102 owner. The portable computer 118 can be further programmed to receive the second validation data via wireless communication from the vehicle computer 104, e.g., the vehicle computer 104 can provide vehicle 102 location coordinates via the communication module 110 according to a wireless protocol such as mentioned above, and to transmit the first validation data to the central computer 120 based on receiving the second validation data from the vehicle computer 104, and possibly also based on determining that the first and second validation data match.

The central computer 120 in turn can be programmed to receive the identifier and the first validation data from the portable computer 118, and to determine second validation data. The second validation data can be a location according to location coordinates (e.g., GPS coordinates) or the like of the vehicle 102. For example, a vehicle 102 communication module 110 could be used to provide the vehicle 102 location to the central server.

The central computer 120 can further be programmed to identify a destination computer 122 based on the identifier. For example, the central computer 120 could store a lookup table or the like specifying addresses of destination computers 122 for respective vehicles 102, i.e., in association with respective vehicle 102 identifiers. Based on a comparison of the first validation data and the second validation data meeting a specified criterion, e.g., resulting in a match wherein the vehicle 102 location and a portable device location are determined to be within a threshold distance, e.g., ten meters, indicating that a portable device is proximate to the vehicle 102, the central computer 120 could execute programming to transmit the message from the portable computer 118 to the destination computer 122.

The central computer 120 can further be programmed to send messages responsive to receiving the message from the portable computer 118 and/or determining that the first and second validation data satisfy the specified criterion. For example, the central computer 120 can further programmed to send a response to the message provided from the destination computer 122 to the portable computer 118, to send a response to the message to the portable computer 118 specifying a status of the vehicle 102, and/or to transmit the second validation data to the vehicle computer 104.

The central computer 120 can be further programmed to determine an address of the destination computer 122 based on the identifier of the vehicle 102. Typically, the destination computer 122 is a fourth computer in the messaging system 100 (i.e., in addition to a vehicle computer 104, portable computer 118, and central computer 120), but the vehicle computer 104 could serve as a destination computer 122, i.e., a message from a portable device could be sent to the vehicle computer 104. Yet further, the central computer 120 can be programmed to transmit the message to a plurality of destination computers 122.

The central computer 120 can be further programmed to authenticate the portable computer 118 as being entitled to send the message to the destination computer 122 prior to determining the second validation data. For example, the portable computer 118 could provide a portable computer 118 identifier, e.g., a login name and/or password or the like, whereby the central computer 120 could determine that the portable computer 118 is authorized to send messages based on vehicle 102 identifiers (i.e., is an authorized user of the messaging system 100) and/or that the portable computer 118 is authorized to send messages to a destination computer 122 associated with the identified vehicle 102.

The vehicle computer 104 can be programmed to display the second validation data via a vehicle 102 human machine interface (HMI). The HMI is a subsystem 106 to allow a user to provide input to, and receive output from, the vehicle computer 104. The HMI can include one or more of a display, a touchscreen display, a microphone, a speaker, etc. The user can provide input to devices such as the vehicle computer 104 via the HMI. The HMI can communicate with the vehicle computer 104 via the vehicle network 112, e.g., the HMI can send a message including the user input provided via a touchscreen, microphone, a camera that captures a gesture, etc., to a computer, and/or can display output, e.g., via a screen, speaker, etc. Accordingly, in one example, the second validation data could be an alphanumeric code, or the like provided on a vehicle 102 display screen and/or output by vehicle 102 speakers external to the vehicle 102. A user of a portable device could then input the displayed code and transmit the displayed code as first validation data to the central computer 120. The vehicle computer 104 could transmit the code as first validation data to the central computer 120, whereupon the specified criterion for the first and second validation data to meet would be a match of the provided alphanumeric codes in the first and second validation data.

Further, the vehicle computer 104 could be programmed to receive input via a microphone arranged to detect sound outside of the vehicle 102, and to transmit the input to the central computer 120. For example, the input could be content for a message for a destination computer 122, and/or could be an alphanumeric code or the like to be included in the first validation data for the portable computer 118. Alternatively, or additionally, the vehicle computer 104 could be further programmed to provide output representing a response to a message from a destination computer 122 via a vehicle 102 HMI (human machine interface).

The vehicle computer 104 could be programmed to store an image captured by a vehicle 102 camera of an environment exterior to the vehicle 102 upon receiving a request for the second validation data from the central computer 120. Similarly, the portable computer 118 could be programmed to actuate an external camera sensor to capture an image of an environment around the vehicle 102, e.g., as directed by a vehicle 102 HMI and/or the central computer 120. The specified criterion for the first and second validation data to meet could then be whether the images matched, e.g., included objects and/or landmarks determined to be the same within a specified degree of confidence, e.g., using a conventional pattern matching algorithm.

Figure 2:
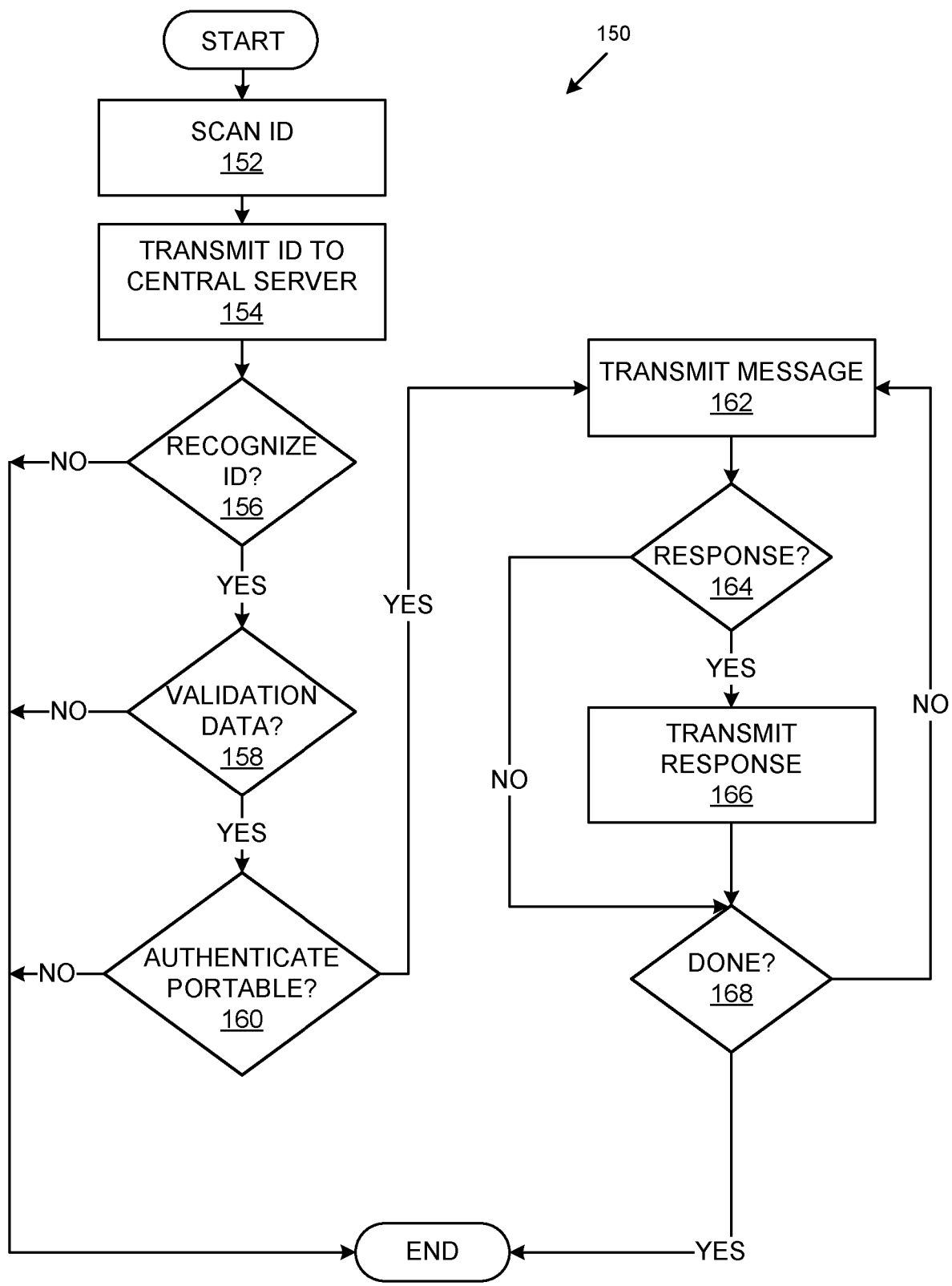
FIG. 2 is a flow diagram illustrating an example process in the messaging system of FIG. 1.

FIG. 2 is a flow diagram illustrating an example process 150 in the messaging system 100 of FIG. 1. The process 150 begins in a block 152, in which the portable computer 118 scans or receives an identifier of a vehicle 102. For example, the portable computer 118 can optically scanned image tag 114 as described above, and/or could receive an identifier wirelessly, e.g., via RFID, Bluetooth, UWB or other RF technology.

Next, in a block 154, the portable computer 118 transmits the vehicle 102 identifier to a central server, e.g., via a wide area network 116, as described above.

Next, in a decision block 156, the central computer 120 determines whether the vehicle 102 identifier provided from the portable computer 118 in the block 154 is recognized, i.e., is associated with a record for a vehicle 102 in a memory, e.g., a database, of the central computer 120. The central computer 120 then transmits an indication back to the portable computer 118 that the vehicle 102 identifier is or is not recognized. If the vehicle 102 identifier is not recognized, then the process 150 ends. Otherwise, the process 150 proceeds to a decision block 158.

In the block 158, the central computer 120 determines whether first and second validation data have been received from the vehicle computer 104 and portable computer 118, respectively. As described above, validation data can include a variety of types of data, such as respective location data of the vehicle 102 and the portable computer 118, an alphanumeric code or the like generated by the vehicle computer 104 and provided for input or capture by the portable computer 118, etc. The central computer 120 could be programmed to determine whether the validation data are received within a predetermined time of receiving the vehicle 102 identifier, e.g., one minute or two minutes, etc. in any case, if validation data is not received, the process 150 ends. Otherwise, a decision block 160 follows the block 158.

It should be noted that various block of the process 150 could be omitted, combined, or carried out in a different order than shown. This is true, for example, of blocks 154-158, which could be combined and/or practiced in a different order. For example, the portable computer 118 could transmit the vehicle 102 identifier and the first validation data of the portable computer 118 in a single message, e.g., the first validation data could be sent along with the vehicle 102 identifier in the block 154.

In the block 160, the central computer 120 determines whether the portable computer 118 that provided the vehicle 102 identifier in the block 154 is authenticated or authorized to send a message to a destination computer 122 associated with the vehicle 102. That is, if the first and second validation data match, e.g., alphanumeric identifiers match, locations of a vehicle 102 and deferrable computer are within a threshold distance, etc., then it may be determined that the portable computer 118 is authorized to transmit a message to a destination computer 122 associated with the vehicle 102.

Following the block 160, in a block 162, a message can be transmitted from the portable computer 118 to a destination computer 122 associated with the vehicle 102. For example, a user of a portable computer 118 could provide input specifying a text message and/or an image (e.g., captured with a camera of a portable computer 118) to be sent to the destination computer 122. The central computer 120 could receive the message and, based on a stored address of one or more destination computers 122 associated with the identified vehicle 102, transmit the message to the one or more destination computers 122.

Following the block 162, in a block 164, the central computer 120 can determine whether a response has been received to the message transmitted in the block 162. In some examples, a response may not be permitted or provided for, whereupon the process 150 may proceed directly to the block 168. In any case, if the central computer 120 determines that a destination computer 122 has provided a response to a message from a portable device, the central computer 120 then transmits the response to the portable device in block 166. Further, although not illustrated in FIG. 2, a portable device and destination computer 122 could exchange further messages.

A decision block 168 is executed following the block 166. In the block 168, the central computer 120 determines whether the process 150 has been completed, e.g., whether any further messages remain to be exchanged. Following the block 168, the process 150 ends. Otherwise, the process 150 returns to the block 162 to transmit a further message or messages.

Data, as that term is used herein, has the plain and ordinary meaning in the context of the computer arts, i.e., information that can be processed and/or stored by a digital computer. Data can be provided and/or represented in a variety of formats, e.g., binary, hexadecimal, alphanumeric e.g., ASCII, etc.

Use of "in response to," "based on," and "upon determining" herein indicates a causal relationship, not merely a temporal relationship.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, any other physical medium with patterns of holes, a RAM, a PROM, an EPROM, a FLASH EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, as mentioned above, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a central computer including a first processor and a first memory; and
a portable computer including a second processor and a second memory, wherein the portable computer is programmed to:
obtain an identifier of a vehicle via a scanner included in the portable computer, and transmit the identifier and first validation data to the central computer, and
transmit a message to the central computer for a destination computer;
wherein the central computer is programmed to:
receive the identifier and the first validation data from the portable computer, determine second validation data,
identify a destination computer based on the identifier, and
upon determining that a comparison of the first validation data and the second validation data meets a specified criterion, transmit the message from the portable computer to the destination computer.

2. The system of claim 1, wherein the identifier is provided on a vehicle window.

3. The system of claim 1, wherein the identifier is provided wirelessly.

4. The system of claim 1, wherein the first validation data is based on location coordinates of the portable computer and the second validation data is based on location coordinates of the vehicle.

5. The system of claim 1, wherein the specified criterion is that the first validation data and the second validation data match.

6. The system of claim 1, wherein the portable computer is further programmed to receive the first validation data via user input.

7. The system of claim 1, wherein the portable computer is further programmed to receive the second validation data via wireless communication from the vehicle computer, and to transmit the first validation data to the central computer based on the second validation data received from the vehicle computer.

8. The system of claim 1, wherein the central computer is further programmed to send a response to the message provided from the destination computer to the portable computer.

9. The system of claim 1, wherein the central computer is further programmed to send a response to the message to the portable computer specifying a status of the vehicle.

10. The system of claim 1, wherein the central computer is further programmed to transmit the second validation data to the vehicle computer.

11. The system of claim 1, wherein the central computer is further programmed to authenticate the portable computer as being entitled to send the message prior to determining the second validation data.

12. The system of claim 1, wherein the central computer is further programmed to determine an address of the destination computer based on the identifier of the vehicle.

13. The system of claim 1, wherein the destination computer is the vehicle computer or a fourth computer.

14. The system of claim 1, wherein the central computer is further programmed to transmit the message to a plurality of destination computers including the destination computer.

15. The system of claim 1, further comprising the vehicle computer including a third processor and a third memory.

16. The system of claim 15, wherein the vehicle computer is programmed to display the second validation data via a vehicle human machine interface (HMI).

17. The system of claim 15, wherein the vehicle computer is programmed to store an image captured by a vehicle camera of an environment exterior to the vehicle upon receiving a request for the second validation data from the central computer.

18. The system of claim 15, wherein the vehicle computer is further programmed to receive input for the message via a microphone arranged to detect sound outside of the vehicle, and to transmit the input to the central computer.

19. The system of claim 15, wherein the vehicle computer is further programmed to provide output representing a response to the message via a vehicle HMI (human machine interface).

* * * * *